Aug. 28, 1923.

J. G. SCHMIDT

AUTOMOBILE BUMPER

Filed March 14, 1923

1,465,999

John G. Schmidt, Inventor

By

Attorney

Patented Aug. 28, 1923.

1,465,999

UNITED STATES PATENT OFFICE.

JOHN G. SCHMIDT, OF SPRINGFIELD GARDENS, NEW YORK.

AUTOMOBILE BUMPER.

Application filed March 14, 1923. Serial No. 625,101.

*To all whom it may concern:*

Be it known that I, JOHN G. SCHMIDT, a citizen of the United States, residing at Springfield Gardens, in the county of Queens and State of New York, have invented certain new and useful Improvements in an Automobile Bumper, of which the following is a specification.

This invention relates to improvements in automobile bumpers and has for its prime object to provide a bumper which will strengthen the weak parts now found in bumpers universally used and to resist bending and breaking of said parts.

A further object of my invention is to provide a bumper of the character indicated, comprising a pair of approximately L-shaped bars, one end of each bar being adapted to be secured to opposite sides of the front of an automobile, the free ends of said bars adapted to engage each other and be held in a locked position by means of a pair of clamping bands.

A still further object of my invention is to provide a bumper comprising a pair of L-shaped bars having means attached to opposite sides of the car and engaging the outer side of each of the L-shaped bars to prevent bending or breaking of the same where the greatest strain is received thereon.

And a still further object of my invention is to provide a pair of bars adapted to be secured to opposite sides of an automobile and having the free ends of said bars engaging the bumper proper intermediate the ends of the same, so as to resist any possibility of the bumper breaking or bending in the middle.

Another object of my invention is to provide a bumper of the character indicated, which is simple in construction, durable, efficient for the purpose intended, and one that can be manufactured and installed on automobiles at a relatively low cost.

These and like objects of the invention will be better understood as the description follows and as is specifically pointed out in the appended claim.

Figure 1:
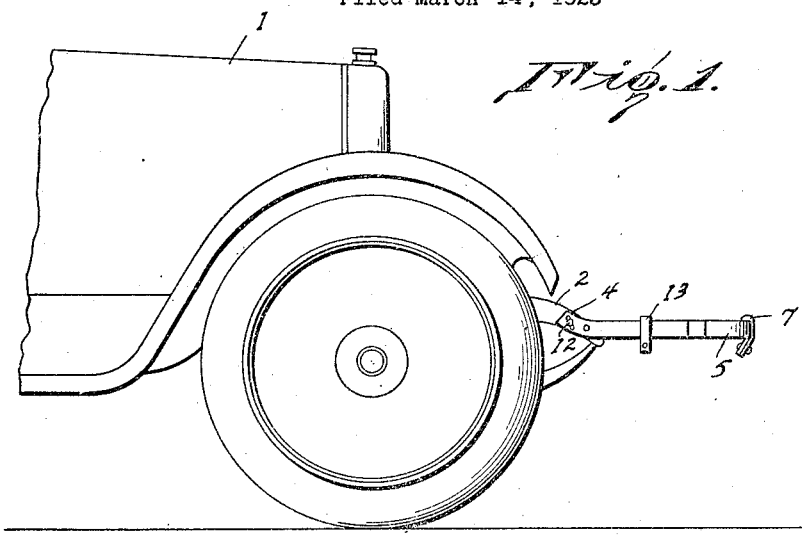
Figure 2:
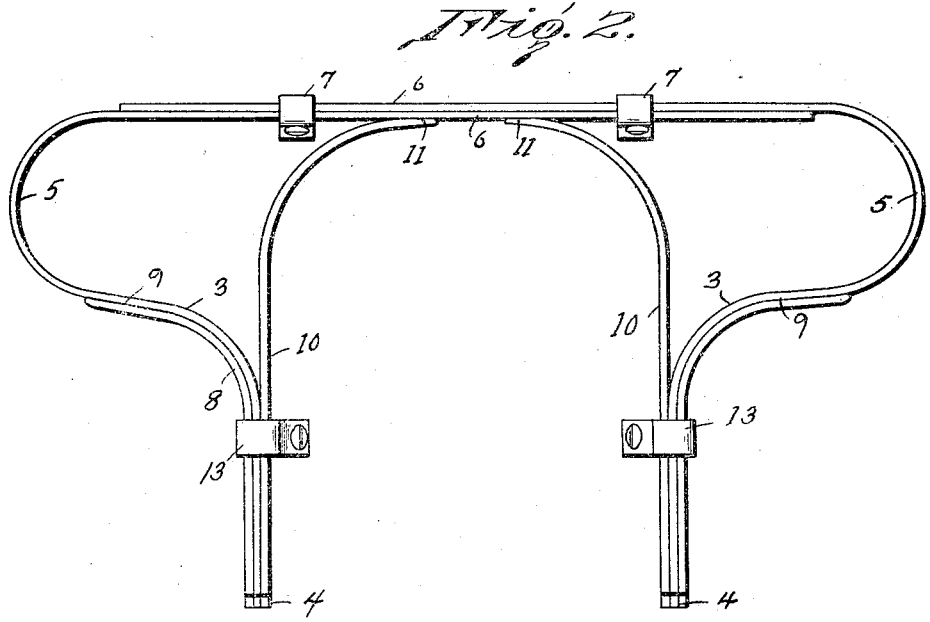

Referring to the accompanying drawing which forms a part of this specification and which clearly shows the construction of my improved bumper, Figure 1 is a side elevation of a portion of an automobile equipped with a bumper constructed in accordance with my invention, and Figure 2 is a top plan view of my improved automobile bumper.

Referring to the accompanying drawing in detail, like characters will be used to designate like parts in the different views.

In the drawing, the numeral 1 indicates as a whole an automobile and 2 the goose neck of the chassis. In constructing my improved automobile bumper for attaching to the goose neck 2, I employ two approximately L-shaped members as indicated by the numeral 3. The ends of said members or bars which engage the goose neck are curved upwardly as at 4 to conform to the shape of the goose neck 2. Each of the members 3 extends outwardly as at 5 and then inwardly as at 6 or across the front of the automobile. The ends 6 of the members 3 are adapted to engage each other and be fastened in locked engagement by means of clamping rings 7.

In order to prevent the members 3 from bending or breaking at the point where they extend outwardly from the automobile, I have provided a plate 8, which engages the outer side of each of the members 3 at the point where the springs are fastened to the springs of an automobile and said plates 8 extend outwardly and conform to the shape of said members 3, so as to prevent beyond a possibility the same breaking or bending at the point indicated by the numeral 9.

In case the ends 6 of the members 3 which constitute the main portion of the fender should receive such jar directly in the center, any possibility of bending or breaking is avoided by the use of a second set of plates indicated by the numeral 10. These plates 10 which are two in number are each positioned against one side of the members 3 and the outer ends of said plates 10 engage the ends 6 as at 11, directly in the center of the bumper.

The rear end of each of the plates 8 and 10 conforms to the shape of the members 3 and both the plates and members are provided with slots which are adapted to align so that a fastening bolt 12 may be employed for securing the fender in position.

An additional reinforcing means, comprises a pair of clamps 13, which are adapted to be positioned around each set of members 3 and plates 8 and 10, as is clearly indicated in the accompanying drawing.

In view of the foregoing description of my invention taken in connection with the accompanying drawing, it is thought that any further explanation as to the construction, operation, and objects of my invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

In an automobile bumper, comprising a pair of L-shaped bars, means for fastening the free ends of said bars together to form a bumper, means for securing the opposite ends of said bars to the goose necks of an automobile, a plate positioned on the outside of each of the above mentioned bars for reinforcing the same, and a plate positioned on the inner side of each of the bars and adapted to engage the free ends of said first mentioned bars for reinforcing the same intermediate their ends.

In testimony whereof, I have affixed my signature in the presence of two witnesses.

JOHN G. SCHMIDT.

Witnesses:
HENRY C. HORSTING,
ADAM KEMMER.